US008032840B2

(12) United States Patent
Haro et al.

(10) Patent No.: US 8,032,840 B2
(45) Date of Patent: Oct. 4, 2011

(54) APPARATUS, METHOD AND COMPUTER PROGRAM PRODUCT FOR GENERATING A THUMBNAIL REPRESENTATION OF A VIDEO SEQUENCE

(75) Inventors: Antonio Haro, Dallas, TX (US); Vidya Setlur, Irving, TX (US); Tolga Capin, Forth Worth, TX (US); George Chen, Irving, TX (US)

(73) Assignee: Nokia Corporation, Espoo (FI)

( * ) Notice: Subject to any disclaimer, the term of this patent is extended or adjusted under 35 U.S.C. 154(b) by 495 days.

(21) Appl. No.: 11/328,617

(22) Filed: Jan. 10, 2006

(65) Prior Publication Data

US 2007/0162873 A1 Jul. 12, 2007

(51) Int. Cl.
*G06F 3/048* (2006.01)
(52) U.S. Cl. ........................................ 715/838; 715/723
(58) Field of Classification Search .................. 715/723, 715/838
See application file for complete search history.

(56) References Cited

U.S. PATENT DOCUMENTS

| | | | | |
|---|---|---|---|---|
| 4,737,921 A * | 4/1988 | Goldwasser et al. | ......... | 345/421 |
| 5,894,333 A * | 4/1999 | Kanda et al. | .................. | 348/597 |
| 6,052,492 A * | 4/2000 | Bruckhaus | ..................... | 382/284 |
| 6,389,168 B2 * | 5/2002 | Altunbasak et al. | ......... | 382/224 |
| 6,665,342 B1 * | 12/2003 | Brown et al. | ............. | 375/240.16 |
| 7,091,988 B2 * | 8/2006 | Hori et al. | ....................... | 345/619 |
| 7,149,974 B2 * | 12/2006 | Girgensohn et al. | .......... | 715/723 |
| 2001/0020981 A1 | 9/2001 | Jun et al. | | |
| 2002/0028026 A1 | 3/2002 | Chen et al. | | |
| 2002/0069218 A1 * | 6/2002 | Sull et al. | .................... | 707/501.1 |
| 2003/0137546 A1 * | 7/2003 | Suh | ................................ | 345/838 |
| 2003/0210261 A1 | 11/2003 | Wu et al. | | |
| 2004/0095396 A1 | 5/2004 | Stavely et al. | | |
| 2004/0197071 A1 | 10/2004 | Zhang et al. | | |
| 2005/0010955 A1 | 1/2005 | Elia et al. | | |
| 2005/0185823 A1 * | 8/2005 | Brown et al. | .................. | 382/103 |
| 2006/0064716 A1 * | 3/2006 | Sull et al. | ......................... | 725/37 |
| 2006/0155684 A1 * | 7/2006 | Liu et al. | ........................... | 707/3 |
| 2007/0036518 A1 * | 2/2007 | Jeong et al. | ..................... | 386/95 |

(Continued)

FOREIGN PATENT DOCUMENTS

EP 1465196 A1 10/2004

OTHER PUBLICATIONS

Hyun Sung Chang, Sanghoon Sull, and Sang Uk Lee. "Efficient video indexing scheme for content-based retrieval", Dec. 1999, IEEE, Transactions on Circuit and System for Video Technology, vol. 9 No. 8, pp. 1269-1279.*

(Continued)

*Primary Examiner* — Tadeese Hailu
*Assistant Examiner* — Patrick F Riegler
(74) *Attorney, Agent, or Firm* — Alston & Bird LLP

(57) ABSTRACT

A system, method and computer program product are provided for generating an image, such as a thumbnail, representation of a video sequence, where the video sequences includes a plurality of frames, at least some of which include an image of a scene that may include one or more objects. The method can include identifying a plurality of objects from the video sequence, and selecting at least some of the identified objects. In addition, the method can include extracting the selected objects from the frames of the video sequence including the respective objects, and combining the selected and extracted objects into an image representation of the video sequence.

18 Claims, 5 Drawing Sheets

U.S. PATENT DOCUMENTS

2007/0041707 A1* 2/2007 Edmunds et al. ............... 386/95
2008/0019610 A1* 1/2008 Matsuzaka et al. ........... 382/284

OTHER PUBLICATIONS

Jonathan D. Courtney, "Automatic Video Indexing via Object Motion Analysis", May 12, 1998, Texas Instruments, Pattern Recognition, vol. 30, Issue 4, pp. 607-625.*

Changick Kim, Jenq-Neng Hwang; *Object-Based Video Abstraction for Video Surveillance Systems*; IEEE Transactions on Circuits and Systems for Video Technology; Dec. 2002; pp. 1128-1138; vol. 12, No. 12.

Frank Shipman, Andreas Girgensohn, Lynn Wilcox; *Creating Navigable Multi-Level Video Summaries*; Proceedings 2003 International Conference on Multimedia and Expo; 2003; pp. 753-756; vol. 2.

M.D. Byrne; *Using Icons to Find Documents: Simplicity is Critical*; Proceedings of the SIGCHI Conference on Human Factors in Computing Systems; 1993; pp. 446-453; AMC Press.

H. W. Chen, J. H. Kuo, W. T. Chu, J. L. Wu; *Action Movies Segmentation and Summarization Based on Tempo Analysis*; Proceedings of the 6$^{th}$ ACM SIGMM International Workshop on Multimedia Information Retrieval; 2004; pp. 251-258; ACM Press, New York, NY.

M. G. Cristel, A. G. Hauptmann, H. D. Wactlar, T. D. Ng; *Colleges as Dynamic Summaries for News Video*; Mullltimedia 2002: Proceedings of the Tenth ACM International Conference on Multimedia; 2002; pp. 561-569; ACM Press, New York, NY.

M. G. Cristel, A. G. Hauptmann, A. S. Warmack, S. A. Crosby; *Adjustable Filmstrips and Skims as Abstractions for a Digital Video Library*; May 1999; 6 pages.

J. M. Corridoni, A. Del Bimbo, S. DeMagistris; *Image Query by Semantical Color content*; Proceedings of the Workshop on Advanced Visual Interfaces; 1996; pp. 213-222.

A. Dekel, O. Bergman; *Synopsus: A Personal Summary Tool for Video*; CHI 2000 Extended Abstracts on Human Factors in Computing Systems; 2000; pp. 4-5; ACM Press, New York.

M. Fayzullin, V. S. Subrahmanian, A. Piccariello, M. L. Sapino; *The CPR Model for Summarizing Video*; Proceedings of the 1$^{st}$ SCM International Workshop on Multimedia Databases; 2003; pp. 2-9; ACM Press, New York, NY.

L. He, E. Sanocki, A. Gupta, J. Grudin; *Auto-Summarization of Audio-Video Presentations*; Proceedings of the Seventh ACM International Conference on Multimedia (Part 1); 1999; pp. 489-498; ACM Press, New York, NY.

T. R. Henry, S. E. Hudson; *Multidimensional Icons*; ACM Transactions on Graphics; 1990; pp. 133-137.

H. Lam, P. Baudisch; *Summary Thumbnails: Readable Overviews for Small Screen Web Browsers*; Proceeding of the SIGCHI Conference on Human Factors in Computing Systems; 2005; pp. 681-690; SCM Press, New York, NY.

J. P. Lewis, R. Rosenholtz, N. Fong, U. Neumann; Visual IDs: Automatic Distinctive Icons for Deskktop Interfaces; 2004; pp. 416-423; *ACM Transactions on Graphics*.

R. Linehart, S. Pfeiffer, W. Effelsberg; *Video Abstracting*; SCM Journal of Communications; 1997; pp. 54-62.

K. Manske, *Video Browsing Using 3d Video Content Trees*; Proceedings of the 1998 Workshop on New Paradigms in Information Visualization and Manipulation; 1998; pp. 20-24; ACM Press, New York, NY.

T. Moriyama, M. Sakauchi; *Video Summarization Based on the Psychological Content in the Track Structure*; Proceedings of the 2000 ACM Workshops on Multimedia; 2000; pp. 191-194; ACM Press, New York, NY.

J. Moyes; *When Users Do and Don't Rely on Icon Shape*; Conference Companion on Human Factors in Computing Systems; 1994; pp. 283-284; ACM Press.

J. Nam, A. H. Tewfik; *Dynamic Video Summarization and Visulaization*;Proceedings of the Seventh ACM International Conference on Multimedia (part 2); 1999; pp. 53-56; ACM Press, New York, NY.

D. Ponceleon, S. Srinivasan, A. Amir, D. Petkovic, D. Diklic; *Key to Effective Video Retrieval: Effective Cataloging and Browsing*; Proceedings of the Sixth ACM International conference on Multimedia; 1998; pp. 99-107; ACM Press, New York, NY.

Y. Taniguchi, A. Akutsu, Y. Tonomura; *PanoramaExcerpts: Extracting and Packing Panoramas for Video Browsing*; Proceedings of the Fifth ACM International Conference on Multimedia; Nov. 1997; pp. 427-436.

S. Uchihashi, J. Foote, A. Girgensohn, J. Boreczky; *Video Manga: Generating Semantically Meaningful Video Summaries*; Proceedings of the Seventh ACM International conference on Multimedia (Part 1); 1999; pp. 383-392; ACM Press, New York, NY.

A. Woodruff, A. Faulring; R. Rosenholtz, J. Morrison, P. Pirolli; *Using Thumbnails to Search the Web*; Proceedings of the SIGCHI Conference on Human Factors in Computing Systems; 2001; pp. 198-205; ACM Press.

M. M. Yeung, B. L. Yeo; *Video Visualization for Compact Presentation and Fast Browsing of Pictorial Content*; IEEE Trans. Circuits Syst. Video Technology; Oct. 1997; pp. 771-785; vol. 7.

D. Zhong, R, Kumar, S. F. Chang; *Real-Time Personalized Sports Video filtering and Summarization*; Proceedings of the Ninth ACM International Conference on Multimedia; 2001; pp. 623-625; ACM Press, New York, NY.

V. Kwatra, A. Schodli, I. Essa, G. Turk, A. Bobick; *Graphcut Textures: Image and Video Systehsis Using Graph Cuts*; Proceedings: ACM Transactions on Graphics; 2003; 10 pages.

A. Schodl, R. Szeliski, D. H. Salesin, I. Essa; *Video Textures*; Oct. 2000; 10 pages.

M. Flickner, H. Sawhney, W. Niblack, J. Ashley, Q. Huang, B. Dom, M. Gorkani, J. Hafner, D. Lee, D. Petkovic, D. Steele; *Query by Image and Video Content: The QBIC System*; Sep. 1995; pp. 23-32; IEEE.

Q. Huang, Z. Liu, A. Rosenberg; *Automated Semantic Structure Reconstruction and Representation Generation for Broadcast News*; Proceedings of SPIE on Storage and Retrieval for Still Image and Video Databases; Jan. 1999; vol. 3656; pp. 50-62.

Y. Ma, H, Zhang; *Video Snapshot: A Bird View of Video Sequence*; 11$^{th}$ International Multimedia Modelling Conference; 2005; 8 pages; IEEE Computer Society.

C. Rother, S. Kumar, V. Kolmogorov, A. Blake; *Digital Tapestry*; 2005; 8 pages; Proceedings of the 2005 IEEE Computer Society Conference on Computer Vision and Pattern Recognition.

M. Tsang, N. Morris, R. Balakrishnan; *Temporal Thumbnails: Rapid Visualization of Time-Based Viewing Data*; Proceedings of the Working Conference on Advanced Visual Interfaces; 2004; pp. 175-178; ACM Press, New York, NY.

M. M. Yeung, B. L. Yeo; *Video Visualization for Compact Presentation and Fast Browsing of Pictorial Content*; IEEE Trans. Circuits Syst. Video Technology; Oct. 1997; 15 pages; vol. 7, No. 5.

R. O. Duda, P. E. Hart, D. G. Stork; *Pattern Classification*; International Journal of Computational Intelligence and Applications; 2001; pp. 335-339; vol. 1, No. 3; Imperial College Press.

Y. Tonomura, A. Akutso, Y. Taniguchi,G. Suzuki; *Structured Video Computing*; IEEE Multimedia; Sep. 1995; pp. 34-43; vol. 3, Issue 3.

* cited by examiner

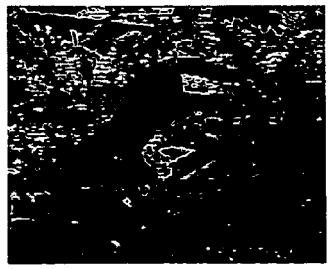  
FIG. 4a.   FIG. 4b.   FIG. 4c.
 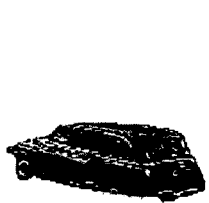 
FIG. 5a.   FIG. 5b.   FIG. 5c.
 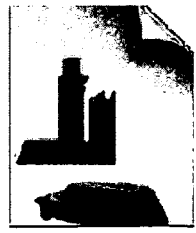
FIG. 6a.   FIG. 6b.

APPARATUS, METHOD AND COMPUTER PROGRAM PRODUCT FOR GENERATING A THUMBNAIL REPRESENTATION OF A VIDEO SEQUENCE

FIELD OF THE INVENTION

The present invention generally relates to systems and methods of browsing video sequences and, more particularly, relates to systems and methods for generating thumbnail representations of video sequences to facilitate browsing of those sequences.

BACKGROUND OF THE INVENTION

As mobile data storage increases and camera-imaging quality improves, users are increasingly capturing and sharing video with their mobile devices. One major drawback of the increasing use of video, however, arises while browsing a graphical user interface for a desired video clip or sequence. Currently, a number of software applications facilitating a user browsing cataloged or otherwise stored video sequences are capable of presenting those sequences in a number of different manners. For example, a number of software applications are capable of presenting the names of stored video sequences in a list from which the user may browse the listed video sequences. Other software applications are capable of additionally or alternatively presenting thumbnail images representative of the video sequences, where each thumbnail representation corresponds to either a single frame or a collection of multiple frames. By presenting a thumbnail representation of a video sequence, these software applications facilitate the user identifying a desired video sequence from among a number of similar thumbnail representations of other video sequences. Further, a thumbnail representation may facilitate more efficient memory recall of video sequences since the user may more readily identify a desired video clip.

Although presenting thumbnail representations that correspond to one or more frames of video sequences facilitates users browsing a number of video sequences, this manner of browsing video sequences has drawbacks. In this regard, conventional software applications that present thumbnail representations in this manner do so without regard to the extent the represented frame(s) may or may not be descriptive of the entire video sequence. Thus, for example, for represented frame(s) that do not have a meaningful relation to the remainder of the video sequence, or for the first frame(s) of a video sequence with a number of significant cut frames, the respective thumbnail representations may not adequately identify those video sequences to the user.

SUMMARY OF THE INVENTION

In light of the foregoing background, exemplary embodiments of the present invention provide an improved apparatus, method and computer program product for generating an image (e.g., thumbnail) representation of a video sequence. In accordance with exemplary embodiments of the present invention, an image or thumbnail representation of a video sequence that comprises a composite of selected objects in one or more frames of the video sequence. In this regard, the objects of the composite may be selected based upon a ranking of those objects in relation to other objects in the frames of the video sequence. Thus, exemplary embodiments of the present invention can generate an image representation that is semantically meaningful of the contents of the video sequence, particularly as compared to conventional thumbnail representations.

According to one aspect of the present invention, a method is provided for generating an image representation of a video sequence, where the video sequences includes a plurality of frames, at least some of which include an image of a scene that may include one or more objects. The method can include identifying a plurality of objects from the video sequence, and selecting at least some of the identified objects. Before identifying the objects, however, the video sequence may be decomposed such that one or more transitions in the video sequence are identified, where each transition includes at least one frame. In such instances, the plurality of objects may be identified from the identified transitions in the video sequence.

The method can also include extracting the selected objects from the frames of the video sequence including the respective objects, and combining the selected and extracted objects into an image representation of the video sequence. In this regard, the selected objects may be extracted such that at least one of the selected objects is extracted from a frame different from the frame from which another of the selected objects is extracted. Further, if so desired, one or more of the identified objects may be altered to thereby denote a relative importance of the respective object(s) in the frames of the video sequence. In such instances, at least one of the altered objects may be combined with at least one other object into the image representation of the video sequence.

Further, the method may include assigning a priority ranking to the identified objects, where the selecting step comprises selecting at least some of the identified objects based upon the assigned priority rankings of the respective objects. In such instances, the priority rankings can be assigned based upon one or more variables associated with each of the identified objects. Such variables may include, for example, the size of the object, the number of frames including the object, a motion characterization of the object, and/or the number of video transitions including the object. Additionally or alternatively, the step of assigning priority rankings may include classifying at least some of the identified objects as a key object or a context object. A object may be classified as a key object based upon the respective object being included in a measurable amount of motion within at least some of the frames of the video sequence, and/or being in the center of focus of at least some of the frames. The identified objects may then be selected such that at least one of the selected objects comprises a key object.

According to other aspects of the present invention, an apparatus and computer program product are provided for generating an image representation of a video sequence. Exemplary embodiments of the present invention therefore provide an improved system, method and computer program product for generating an image representation of a video sequence. And as indicated above and explained in greater detail below, the system, method and computer program product of exemplary embodiments of the present invention may solve the problems identified by prior techniques and may provide additional advantages.

BRIEF DESCRIPTION OF THE DRAWINGS

Figure 1:
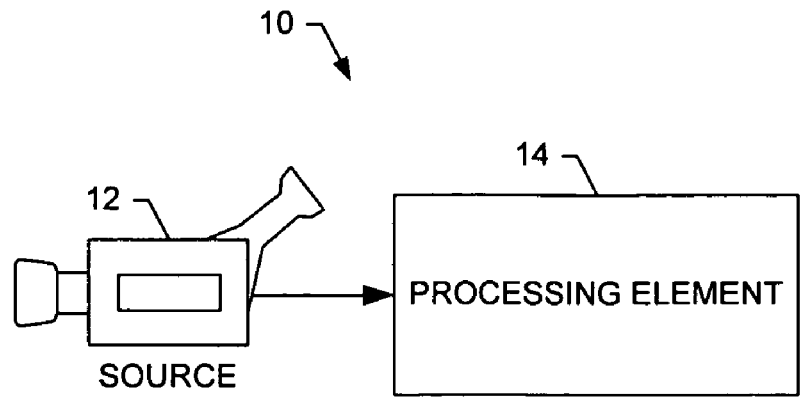
Figure 2:
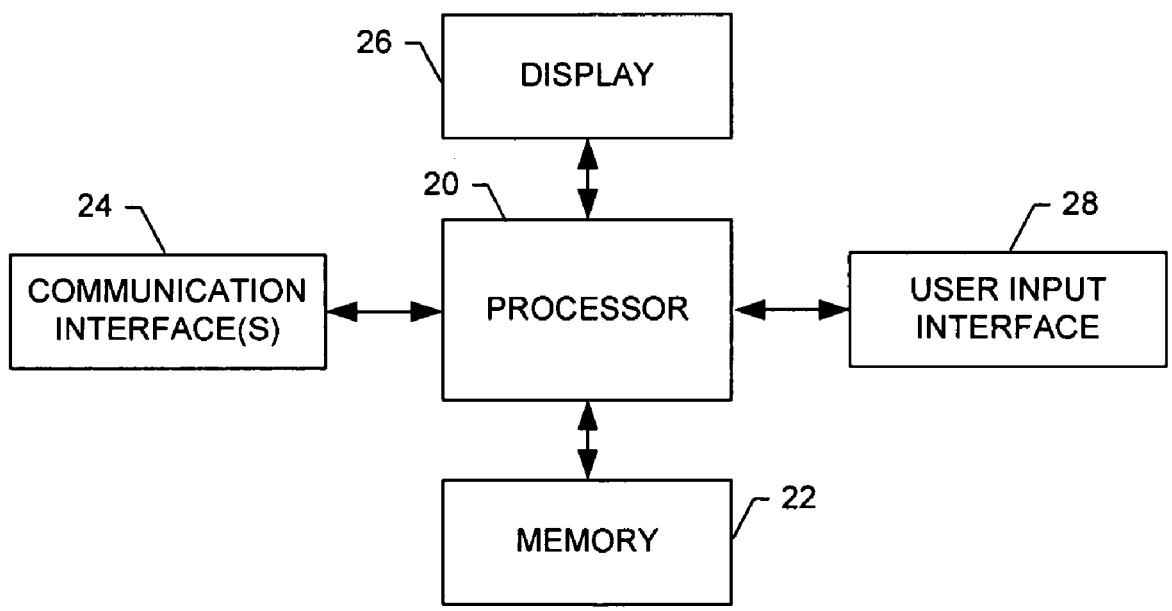
Figure 3:
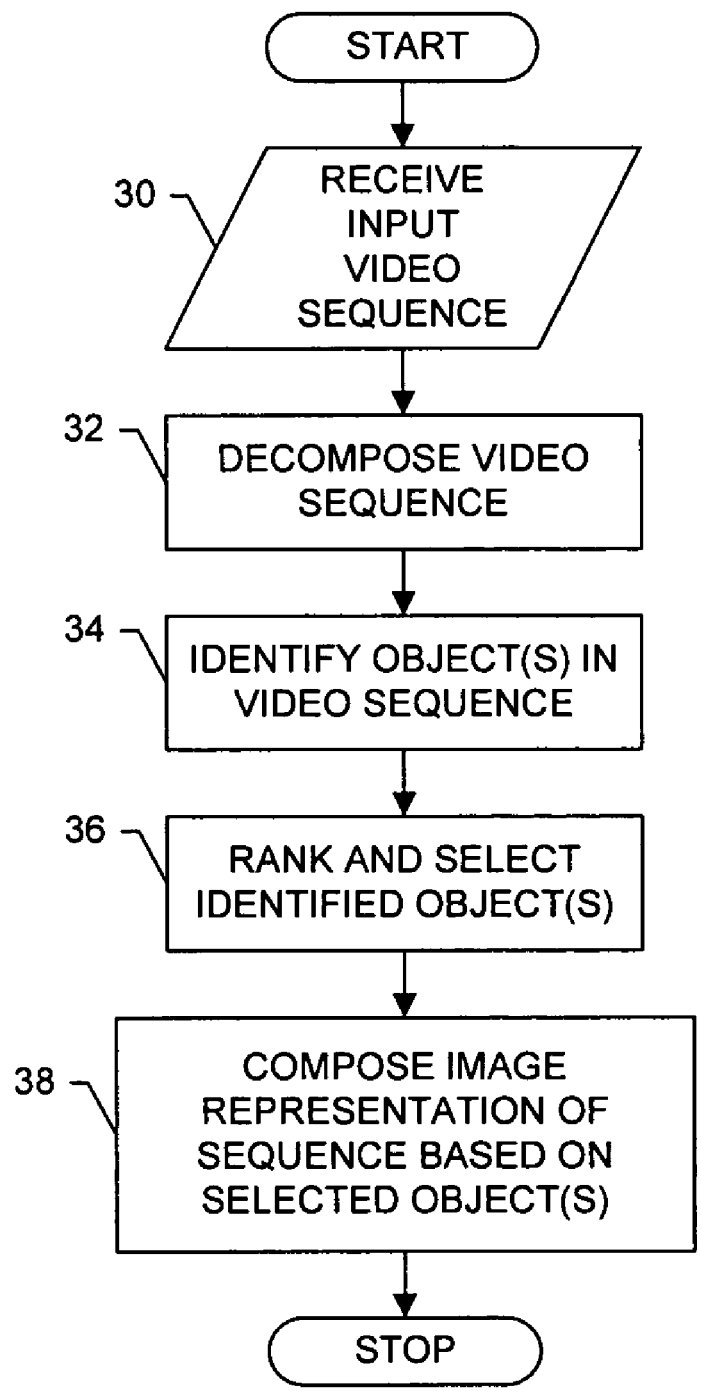
Figure 7A:
Figure 8A:
Figure 7B:
Figure 8B:
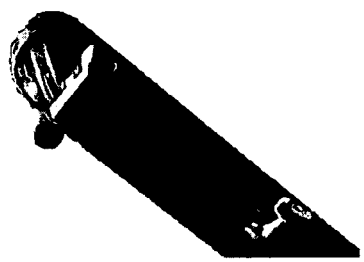
Figure 7C:
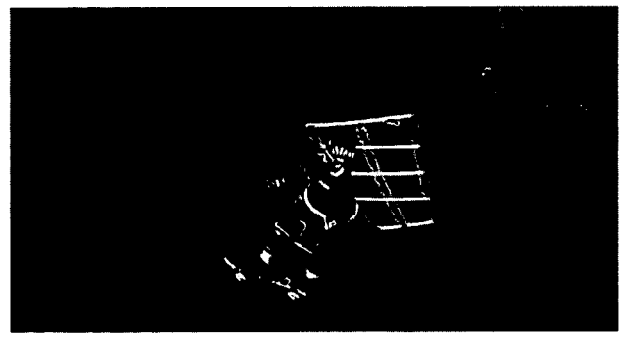
Figure 8C:
Figure 7D:
Figure 8D:
Figure 9A:
Figure 9B:

Having thus described the invention in general terms, reference will now be made to the accompanying drawings, which are not necessarily drawn to scale, and wherein:

FIG. 1 is a block diagram a system for generating a thumbnail representation of a video sequence, in accordance with exemplary embodiments of the present invention;

FIG. 2 is a schematic block diagram of a processing element of the system of FIG. 1, in accordance with exemplary embodiments of the present invention;

FIG. 3 is a flowchart illustrating various steps in a method of generating a thumbnail representation of a video sequence, in accordance with exemplary embodiments of the present invention;

FIGS. 4a, 4b and 4c are three exemplary frames of a first video sequence, in accordance with exemplary embodiments of the present invention;

FIGS. 5a, 5b and 5c are identified objects extracted from the respective frames of FIGS. 4a, 4b and 4c, in accordance with exemplary embodiments of the present invention;

FIGS. 6a and 6b are thumbnail representations of the first video sequence including the frames of FIGS. 4a, 4b and 4c, the representations generated in accordance with exemplary embodiments of the present invention;

FIGS. 7a, 7b, 7c and 7d are four exemplary frames of a second video sequence, in accordance with exemplary embodiments of the present invention;

FIGS. 8a, 8b, 8c and 8d are identified objects extracted from the respective frames of FIGS. 7a, 7b, 7c and 7d, in accordance with exemplary embodiments of the present invention; and FIGS. 9a and 9b are thumbnail representations of the second video sequence including the frames of FIGS. 7a, 7b, 7c and 7d, the representations generated in accordance with exemplary embodiments of the present invention.

DETAILED DESCRIPTION OF THE INVENTION

The present invention now will be described more fully hereinafter with reference to the accompanying drawings, in which preferred exemplary embodiments of the invention are shown. This invention may, however, be embodied in many different forms and should not be construed as limited to the exemplary embodiments set forth herein; rather, these exemplary embodiments are provided so that this disclosure will be thorough and complete, and will fully convey the scope of the invention to those skilled in the art. Like numbers refer to like elements throughout.

Referring to FIG. 1, an illustration of one system that would benefit from the present invention is provided. The system, method and computer program product of exemplary embodiments of the present invention will be primarily described without respect to the environment within which the system, method and computer program product operate. It should be understood, however, that the system, method and computer program product may operate in a number of different environments, including mobile and/or fixed environments, wireline and/or wireless environments, standalone and/or networked environments or the like. For example, the system, method and computer program product of exemplary embodiments of the present invention can operate in mobile communication environments whereby mobile terminals operating within one or more mobile networks include or are otherwise in communication with one or more sources of video sequences.

The system 10 includes a video source 12 and a processing element 14. Although shown as separate entities, it should be understood that in some embodiments, a single entity may support both the video source and processing element, logically separated but co-located within the respective entity. For example, a mobile terminal may support a logically separate, but co-located, video source and processing element. Irrespective of the manner of implementing the system, however, the video source can comprise any of a number of different entities capable of providing one or more sequences of video. Like the image source, the processing element can comprise any of a number of different entities capable of processing video sequences from the image source to automatically generate thumbnail image representations of those sequences, such as for facilitating a user browsing a library of video sequences, as explained below. In this regard, each sequence of video provided by the video source can include a plurality of frames, each of which comprises an image of a scene that may include one or more objects. The image source can comprise, for example, an image capture device (e.g., video camera), a video cassette recorder (VCR), DVD player, a video file stored in memory, or the like. In this regard, the image source can be capable of providing one or more video sequences in a number of different formats including, for example, Third Generation Platform (3GP), AVI (Audio Video Interleave), Windows Media®, MPEG (Moving Pictures Expert Group), QuickTime®, RealVideo®, Shockwave® (Flash®) or the like.

Referring now to FIG. 2, a block diagram of an entity capable of operating as a processing element 14 is shown in accordance with one exemplary embodiment of the present invention. As shown and described herein, the processing element can comprise, for example, a personal computing (PC) device such as a desktop or laptop computer, a server, a workstation, a media center device or other PC derivative, a personal video recorder, portable media consumption device (mobile terminal, personal digital assistant (PDA), gaming and/or media console, etc.), dedicated entertainment device, television, digital television set-top box, other consumer electronic device or the like. As shown, the processing element includes various means for performing one or more functions in accordance with exemplary embodiments of the present invention, including those more particularly shown and described herein. It should be understood, however, that the processing element may include alternative means for performing one or more like functions, without departing from the spirit and scope of the present invention. More particularly, for example, as shown in FIG. 2, the processing element can include a processor 20 connected to a memory 22. The memory can comprise volatile and/or non-volatile memory, and typically stores content, data or the like. For example, the memory can store client applications, instructions or the like for the processor to perform steps associated with operation of the entity in accordance with exemplary embodiments of the present invention. Also, for example, the memory can store one or more video sequences, such as those received from the video source 12. And to facilitate browsing of one or more of those sequences, the memory can further store thumbnail representations of one or more respective sequences, where one or more of those thumbnail representations may include one or more objects identified or otherwise recognized from the respective sequences.

As described herein, the client application(s), instructions or the like may comprise software operated by the processing element 14. It should be understood, however, that any one or more of the client applications described herein can alternatively comprise firmware or hardware, without departing from the spirit and scope of the present invention. Generally, then, the processing element can include one or more logic elements for performing various functions of one or more client application(s), instructions or the like. As will be appreciated, the logic elements can be embodied in any of a number of different manners. In this regard, the logic elements performing the functions of one or more client applications, instructions or the like can be embodied in an integrated circuit assembly including one or more integrated circuits integral or otherwise in communication with the processing element or more particularly, for example, the processor 20 of the processing element. The design of integrated circuits is by and large a highly automated process. In this regard, complex and powerful software tools are available for converting a logic level design into a semiconductor circuit design ready to be etched and formed on a semiconductor substrate. These software tools automatically route conductors and locate components on a semiconductor chip using well established rules of design as well as huge libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

In addition to the memory 22, the processor 20 can also be connected to at least one interface or other means for displaying, transmitting and/or receiving data, content or the like. In this regard, the interface(s) can include at least one communication interface 24 or other means for transmitting and/or receiving data, content or the like. In addition to the communication interface(s), the interface(s) can also include at least one user interface that can include one or more earphones and/or speakers, a display 26, and/or a user input interface 28. The user input interface, in turn, can comprise any of a number of devices allowing the entity to receive data from a user, such as a microphone, a keypad, a touch display, a joystick, image capture device (e.g., digital camera) or other input device.

As explained in the background section, a number of current software applications facilitating a user browsing cataloged or otherwise stored video sequences are capable of presenting those sequences in a number of different manners, such as by presenting thumbnail images representative of the video sequences, where each thumbnail representation corresponds to either a single frame or a collection of multiple frames. And although such a technique for facilitating browsing of video sequences facilitates a user identifying a desired video sequence, it has a drawback at least insofar as the represented frame(s) are not very descriptive of the entire video sequence. Exemplary embodiments of the present invention are therefore capable of generating a thumbnail representation that comprises a composite of one or more objects in one or more frames of the video sequence, where the object(s) may be selected based upon a ranking of those objects in relation to other objects in the frames of the video sequence. Thus, exemplary embodiments of the present invention are capable of generating a thumbnail representation semantically meaningful of the contents of the video sequence, as compared to conventional thumbnail representations including the first or some randomly selected frame of the sequence.

Reference is now made to FIG. 3, which illustrates a flowchart including steps in a method of generating a thumbnail representation of a video sequence, in accordance with exemplary embodiments of the present invention. As shown, the flowchart includes a number of steps for performing the functions of a processing element 14 in the method of generating a thumbnail. It should be understood that the steps may be implemented by various means, such as hardware and/or firmware, including those described above. In such instances, the hardware and/or firmware may implement respective steps alone and/or under control of one or more computer program products. In this regard, such computer program product(s) can include at least one computer-readable storage medium (e.g., memory 22) and software including computer-readable program code portions, such as a series of computer instructions, embodied in the computer-readable storage medium.

As shown in block 30, the illustrated method of generating a thumbnail representation of a video sequence includes the processing element 14, or more particularly for example a client application of the processing element, receiving or otherwise being provided with a video sequence from the video source 12. As indicated above, the video sequence can include a plurality of frames, each of which comprises an image of a scene that may include one or more objects. After receiving the video sequence, the processing element is capable of decomposing the frames of the video sequence to identify one or more three-dimensional (spatial and temporal) planes of texturally similar regions, as shown in block 32. For a brief description of one technique suitable for decomposing the video sequence, see Kwatra et al., *Graphcut Textures: Image and Video Synthesis Using Graph Cuts*, ACM TRANSACTIONS ON GRAPHICS (TOG), July 2003, at 277-286, the contents of which are hereby incorporated by reference in its entirety.

In accordance with one technique for decomposing the video sequence, the processing element 14 can first identify one or more transitions in the video sequence. In this regard, a video transition such as a scene change generally separates parts of the video sequence and may itself include a number of frames of the sequence. Transitions can be identified in any of a number of different manners, such as based on pair-wise image comparisons in a manner similar to that disclosed in S. Uchihashi et al., *Video Manga: Generating Semantically Meaningful Video Summaries*, in MULTIMEDIA '99: PROC. OF THE SEVENTH sACM INT'L CONF. ON MULTIMEDIA (PART 1), at 383-392, the content of which is hereby incorporated by reference in its entirety. For one or more of the identified transitions, then, the processing element can perform motion analysis to measure the motion of each pixel of each frame in the respective transitions, from which the processing element can perform a graph cut analysis in the spatial and temporal dimensions across the respective transitions to form three-dimensional planes segmenting the transition into one or more three-dimensional (spatial and temporal) planes of texturally similar regions.

Irrespective of exactly how the video sequence is decomposed, the processing element 14 can thereafter identify one or more objects in one or more of the video transitions based upon the measured motion and identified planes of texturally similar regions, as shown in block 34. In this regard, the identified texturally similar regions can be clustered based on textural similarity to acquire clusters of textured regions (e.g. outlined strawberries). Redundant textured regions can then be removed to leave only single instances, such as based on size (e.g., out of all the regions texturally similar to a detected strawberry, keep only the largest one). Further, if so desired, the processing element may process the identified objects to identify and remove any duplicate objects, thereby leaving visually and semantically distinct objects from which a composite may be generated, as explained below. The identified objects can be processed in this regard in accordance with any of a number of different techniques, such as by performing a cluster analysis. For more information on such cluster analysis techniques, see Duda et al., PATTERN CLASSIFICATION (2001); and Gersho & Gray, VECTOR QUANTIZATION AND SIGNAL COMPRESSION (1992), the content of both of which are hereby incorporated by reference in their entireties.

After and irrespective of exactly how one or more objects in one or more of the video transitions are identified, the processing element 14 can thereafter rank or otherwise assign a priority ranking to the identified objects, and select a predetermined number of the objects based on the priority rankings, such as by selecting a predetermined number of the highest ranked objects, as shown in block 36. In this regard, the priority rankings can be assigned to the identified objects in accordance with any of a number of different algorithms based upon any of a number of different variables. The variables of an object from which the processing element can assign a ranking to the object can include, for example, the size of the object, the number of frames including the object, a motion characterization of the object (e.g. linear, periodic, etc.), and/or number of video transitions including the object (calculated, e.g., during the duplicate removal step). In accordance with one exemplary algorithm, then, objects can be ranked by area, number of objects clustered about a particular cluster center (e.g., before removing redundant objects—based on number of times it appeared in the video), periodicity of motion, or the like. The algorithm can then sort the identified objects based on their rankings (e.g., highest ranked to lowest ranked) and keep only N objects (e.g., N highest), where N can be pre-specified (e.g., 2-3).

After selecting a predetermined number of the objects, the processing element 14 can compose an image (e.g., thumbnail) representation of the video sequence based upon the selected objects, such as by extracting one or more of the selected objects from their respective frames of the video sequence and forming a composite image of the extracted objects, as shown in block 38. The composite image can be formed by combining one or more of the selected objects in an aesthetically pleasing and visually distinctive manner to maximize user recall of the video's content and to automatically maximize differentiation between similar representations of other video sequences. The processing element can compose the thumbnail representation in any of a number of different manners, such as based upon one or more artistic techniques for generating digital montages as briefly explained below. For more information on a number of such techniques, see Eismann, PHOTOSHOP: MASKING AND COMPOSITING (2004); and Knight & Glaser, THE GRAPHIC DESIGNER'S GUIDE To EFFECTIVE VISUAL COMMUNICATION: CREATING HIERARCHIES WITH TYPE, IMAGE, AND COLOR (2005), the content of both of which are hereby incorporated by reference in their entireties.

The processing element 14 can composite the selected objects either directly (photorealistic), or in an abstracted manner by reducing the color space of one or more of the objects and then compositing the objects (non-photorealistic). In this regard, many compositing techniques utilized by the processing element can be derived from how the human visual system perceives and processes visual information. Thus, before, after or as the processing element assigns priority rankings to the objects, the processing element can apply a number of rules to alter one or more objects to thereby denote the relative importance of those objects in the frames of the video sequence. For example, as the human eye may move from dark images to light images, the processing element can lighten one or more-important objects (key objects that may correspond, e.g., to the higher ranked objects), and darken one or more less-important objects (context objects that may correspond, e.g., to the lower ranked objects) to guide the user to the more-important objects in the composite. Also, for example, as the human eye may move from soft images to sharp images, the processing element can use selective softening and sharpening image filtering techniques to guide the user's line of focus. In addition, for example, as the human eye may move away from less detailed images to more detailed images (or portions thereof), the processing element can add more detail and/or texture to one or more important objects to attract the user's attention to those objects. Further, for example, as the human eye may be attracted to color images, the processing element can add color to one or more-important objects, and/or reduce the color of one or more less-important objects. And in yet another example, as the human visual system may perceive larger objects as being more important, the processing element can increase the size of one or more-important objects, and/or reduce the size of one or more less-important objects.

Further, for example, as the processing element 14 performs either photorealistic and non-photo realistic compositing, the processing element can be configured to observe a number of general rules to compose a more aesthetically pleasing representation of the video sequence. For example, the processing element can reduce alignment artifacts by matching and/or aligning the field of view of two adjacent objects. In this regard, the processing element may determine two-point and/or three-point perspective based upon the objects themselves or through information from the video source 12. From the determined perspective, then, the processing element can align objects by performing operations such as object rotation operations, scale operations and/or more complex image-based rendering operations.

Also for example, the processing element 14 can compose the thumbnail representation such that foreground objects are larger than background objects, and/or such that the scale of the objects is consistent throughout the thumbnail representation, the front object of any overlapping object thereby being intended to be closer in perspective as the human visual system may infer as much. In addition, for example, the processing element can compose the thumbnail representation to maintain consistency in color hues and contrast in the included objects to reduce "patchiness." The processing element can, for example, compose the thumbnail representation to harmonize any shadows and/or reflections associated with the objects as it may be desirable for any shadows and reflections accompanying any extracted objects to be consistent in the environment (i.e., the thumbnail representation) into which those objects are composited. Further, for example, the processing element can perform one or more additional operations on one or more of the extracted objects to enhance the thumbnail representation, such as by performing an anti-aliasing operation on one or more segmented edges of one or more objects to increase visual coherence in the thumbnail representation. Other implementations may include the use of motion lines in the icons, cartoonized objects and other placement rules.

After the thumbnail representation is composed, the thumbnail representation can be saved and associated with the respective video sequence for use in an appropriate application domain. In this regard, the processing element may be configured to compose a number of alternative thumbnail representations such that the user may optionally select a representation from a set of alternative representations to associate with the video sequence. Irrespective, the user may thereafter be capable of more quickly identifying a desired video sequence based upon its associated thumbnail representation, such as by browsing a number of thumbnail representations of a number of video sequences and selecting the thumbnail of the desired video. It should also be noted that exemplary embodiments of the present invention may also be used by online services, search engines or the like to enable users (of the processing element 14) to search for video sequences local to and/or remote from (e.g., across the Internet from) the respective services, search engines or the like.

To illustrate various benefits of exemplary embodiments of the present invention, consider a video sequence including the three frames of FIGS. 4a, 4b and 4c, those frames being within three identified transitions in the video sequence. In such an instance, after the processing element 14 receives and decomposes the video sequence (see FIG. 3, blocks 30, 32), the processing element can identify one or more objects in the three identified transitions (see block 34). In first, second and third transitions including the respective frames of FIGS. 4a, 4b and 4c, for example, the processing element may identify a plant, an automobile and a building, as shown extracted from their respective frames in FIGS. 5a, 5b and 5c. After ranking the identified objects and selecting one or more of the identified objects (see block 36), the processing element can compose an image (e.g., thumbnail) representation of the video sequence based upon the selected objects. In this regard, the processing element can extract the selected objects from their respective frames of the video sequence and form a composite image of the extracted objects (see block 38). Consider, for example, that the identified plant and automobile are selected. In such an instance, the processing element can extract the plant and automobile from their respective frames, as shown in FIGS. 5a and 5b, and form a composite image of the extracted objects, such as shown in FIG. 6a. Alternatively, consider, for example, that the processing element selects the identified automobile and building. In that instance, the processing element can extract the automobile and building from their respective frames, as shown in FIGS. 5b and 5c, and form a composite image of the extracted objects, such as shown in FIG. 6b.

To further illustrate various benefits of exemplary embodiments of the present invention, consider a video sequence including the four frames of FIGS. 7a, 7b, 7c and 7d, those frames being within four identified transitions in the video sequence. Here, after the processing element 14 receives and decomposes the video sequence (see FIG. 3, blocks 30, 32), the processing element can identify one or more objects in the four identified transitions (see block 34). In first, second, third and fourth transitions including the respective frames of FIGS. 7a, 7b, 7c and 7d, for example, the processing element may identify a skater in a first pose, a skateboard, the skater and a second pose, and the skater in a third pose, as shown extracted from their respective frames in FIGS. 8a, 8b, 8c and 8d.

After identifying objects in the video transitions, the processing element 14 can rank or otherwise assign a priority ranking to the identified objects, and select a predetermined number of the objects based on the priority rankings (see block 36). In this example, ranking one or more identified objects may include classifying those objects as key objects or context objects, where the key objects represent the main actors in the story (e.g., the skater) and the context objects provide scene information (e.g., skateboard). In this regard, key objects may be classified as such based upon on their role in the video sequence, which may be evidenced for example by being involved in an appreciable or at least a measurable amount of motion, and/or by being in the center of focus of a number of frames. The remaining objects not otherwise classified as key objects, then, may be classified as context objects. It should be understood, however, that key objects of one or more transitions may be classified as context objects in one or more other transitions, and vice versa.

After ranking the identified objects and selecting one or more of the identified objects, the processing element can compose an image (e.g., thumbnail) representation of the video sequence based upon the selected objects. In this regard, the processing element can extract the selected objects from their respective frames of the video sequence and form a composite image of the extracted objects (see block 38). The objects may be selected such that the composed image includes at least one key object, which may be increased in size over other included objects (key or context objects) in the image. Consider, for example, that the identified skater in the first pose (key object) and the skateboard (context object) are selected. In such an instance, the processing element can extract the skater in the first pose and skateboard from their respective frames, as shown in FIGS. 8a and 8b, and form a composite image of the extracted objects, such as shown in FIG. 9a. Alternatively, consider, for example, that the identified skater in the second pose (first key object) and the skater in the third pose (second key object) are selected. In that instance, the processing element can extract the skater in the second pose and the skater in the third pose from their respective frames, as shown in FIGS. 8c and 8d, and form a composite image of the extracted objects, such as shown in FIG. 9b with the second key object being increased in size of the first key object.

As explained above, the processing element 14 can extract selected objects from their respective frames, and combine those objects into the image representation of the video sequence. However, it should be understood that the processing element may extract one or more, if not all, identified objects from their respective frames of the video sequence at any point after the processing element identifies the respective frames. Thus, for example, the identified objects may be extracted from their respective frames after being identified but before being ranked and/or selected (see block 36).

Further, as explained above the image representation of a video sequence generated in accordance with exemplary embodiments of the present invention may comprise or otherwise be considered a thumbnail image, which may be small or otherwise miniaturized in nature. Thus, the image representation generated in accordance with exemplary embodiments of the present invention may be small or otherwise of a size classifying the image representation as a thumbnail. It should be understood, however, that the image representation may comprise any of a number of different sizes, some of which may be larger than that required to classify the image representation as a thumbnail.

According to one aspect of the present invention, the functions performed by one or more of the entities of the system, such as the source processing element 14, may be performed by various means, such as hardware and/or firmware, including those described above, alone and/or under control of a computer program product (client application). The computer program product for performing one or more functions of exemplary embodiments of the present invention includes a computer-readable storage medium, such as the non-volatile storage medium, and software including computer-readable program code portions, such as a series of computer instructions, embodied in the computer-readable storage medium.

In this regard, FIG. 3 is a flowchart of methods, systems and program products according to the invention. It will be understood that each block or step of the flowchart, and combinations of blocks in the flowchart, can be implemented by various means, such as hardware, firmware, and/or software including one or more computer program instructions. As will be appreciated, any such computer program instructions may be loaded onto a computer or other programmable apparatus (i.e., hardware) to produce a machine, such that the instructions which execute on the computer or other programmable apparatus create means for implementing the functions specified in the flowchart's block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the flowchart's block(s) or step(s). The computer program instructions may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions specified in the flowchart's block(s) or step(s).

Accordingly, blocks or steps of the flowchart support combinations of means for performing the specified functions, combinations of steps for performing the specified functions and program instruction means for performing the specified functions. It will also be understood that one or more blocks or steps of the flowchart, and combinations of blocks or steps in the flowchart, can be implemented by special purpose hardware-based computer systems which perform the specified functions or steps, or combinations of special purpose hardware and computer instructions.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific exemplary embodiments disclosed and that modifications and other embodiments are intended to be included within the scope of the appended claims. Although specific terms are employed herein, they are used in a generic and descriptive sense only and not for purposes of limitation.

What is claimed is:

1. An apparatus comprising a processor and a memory storing executable instructions that in response to execution by the processor cause the apparatus or another apparatus to at least:
   decompose a video sequence including a plurality of frames, wherein at least some of the frames include an image of a scene, at least some of the scenes including at least one object, the images of the at least some of the scenes including at least one image of the respective at least one object, wherein being caused to decompose a video sequence includes being caused to identify one or more transitions in the video sequence, each of the identified one of more transitions including at least one frame;
   identify a plurality of objects from within the at least one frame of the identified one or more transitions in the video sequence;
   assign a priority ranking to the identified objects, wherein being caused to assign a priority ranking includes being caused to assign a priority ranking to the identified objects based upon at least one variable associated with each of the identified objects, the at least one variable of an identified object comprising at least one of a size of the object, a number of frames including the object, a motion characterization of the object, or a number of video transitions including the object;
   select at least some of the identified objects based upon the assigned priority rankings of the respective objects;
   extract the selected objects from the frames of the video sequence including the respective objects; and
   combine the selected and extracted objects into an image representation of the video sequence.

2. An apparatus according to claim 1, wherein being caused to extract the selected objects includes being caused to extract the selected objects such that at least one of the selected objects is extracted from a frame different from the frame from which another of the selected objects is extracted.

3. An apparatus according to claim 1, wherein the memory stores executable instructions that in response to execution by the processor cause the apparatus or the other apparatus to further:
   alter at least one of the identified objects to thereby denote a relative importance of the respective at least one object in the frames of the video sequence, at least one of the altered objects being combined with at least one other object into the image representation of the video sequence.

4. An apparatus according to claim 1, wherein being caused to assign a priority ranking includes being caused to classify at least some of the identified objects as a key object or a context object, at least one object being classified as a key object based upon at least one of the respective object being included in a measurable amount of motion within at least some of the frames of the video sequence, or being in a center of focus of at least some of the frames, and
   wherein being caused to select at least some of the identified objects includes being caused to select at least some of the identified objects such that at least one of the selected objects comprises a key object.

5. An apparatus according to claim 1, wherein the apparatus is adapted for implementation by at least one of a personal computing device, a media center device, a personal video recorder, a portable media consumption device, a dedicated entertainment device, a television, or a digital television set-top box.

6. An apparatus comprising:
   a first means for decomposing a video sequence including a plurality of frames, wherein at least some of the frames include an image of a scene, at least some of the scenes including at least one object, the images of the at least some of the scenes including at least one image of the respective at least one object, wherein the first means being for decomposing a video sequence includes being for identifying one or more transitions in the video sequence, each of the identified one of more transitions including at least one frame;
   a second means for identifying a plurality of objects from within the at least one frame of the identified one or more transitions in the video sequence;
   a third means for assigning a priority ranking to the identified objects, wherein the third means is for assigning the priority ranking to the identified objects based upon at least one variable associated with each of the identified objects, the at least one variable of an identified object comprising at least one of a size of the object, a number of frames including the object, a motion characterization of the object, or a number of video transitions including the object;
   a fourth means for selecting at least some of the identified objects based upon the assigned priority rankings of the respective objects;
   a fifth means for extracting the selected objects from the frames of the video sequence including the respective objects; and
   a sixth means for combining the selected and extracted objects into an image representation of the video sequence.

7. An apparatus according to claim 6, wherein the fifth means is for extracting the selected objects such that at least one of the selected objects is extracted from a frame different from the frame from which another of the selected objects is extracted.

8. An apparatus according to claim 6 further comprising:
a sixth means for altering at least one of the identified objects to thereby denote a relative importance of the respective at least one object in the frames of the video sequence, at least one of the altered objects being combined with at least one other object into the image representation of the video sequence.

9. An apparatus according to claim 6, wherein the third means is for assigning the priority ranking including classifying at least some of the identified objects as a key object or a context object, at least one object being classified as a key object based upon at least one of the respective object being included in a measurable amount of motion within at least some of the frames of the video sequence, or being in a center of focus of at least some of the frames, and
wherein the fourth means is for selecting at least some of the identified objects such that at least one of the selected objects comprises a key object.

10. An apparatus according to claim 6, wherein the apparatus is adapted for implementation by at least one of a personal computing device, a media center device, a personal video recorder, a portable media consumption device, a dedicated entertainment device, a television, or a digital television set-top box.

11. A method comprising:
decomposing a video sequence including a plurality of frames, wherein at least some of the frames include an image of a scene, at least some of the scenes including at least one object, the images of the at least some of the scenes including at least one image of the respective at least one object, wherein decomposing a video sequence includes identifying one or more transitions in the video sequence, each of the identified one of more transitions including at least one frame;
identifying a plurality of objects from within the at least one frame of the identified one or more transitions in the video sequence;
assigning a priority ranking to the identified objects, wherein assigning a priority ranking comprises assigning a priority ranking to the identified objects based upon at least one variable associated with each of the identified objects, the at least one variable of an identified object comprising at least one of a size of the object, a number of frames including the object, a motion characterization of the object, or a number of video transitions including the object;
selecting at least some of the identified objects based upon the assigned priority rankings of the respective objects;
extracting the selected objects from the frames of the video sequence including the respective objects; and
combining the selected and extracted objects into an image representation of the video sequence.

12. A method according to claim 11, wherein extracting the selected objects comprises extracting the selected objects such that at least one of the selected objects is extracted from a frame different from the frame from which another of the selected objects is extracted.

13. A method according to claim 11 further comprising:
altering at least one of the identified objects to thereby denote a relative importance of the respective at least one object in the frames of the video sequence, at least one of the altered objects being combined with at least one other object into the image representation of the video sequence.

14. A method according to claim 11, wherein assigning a priority ranking includes classifying at least some of the identified objects as a key object or a context object, at least one object being classified as a key object based upon at least one of the respective object being included in a measurable amount of motion within at least some of the frames of the video sequence, or being in a center of focus of at least some of the frames, and
wherein selecting at least some of the identified objects comprises selecting at least some of the identified objects such that at least one of the selected objects comprises a key object.

15. A computer program product comprising a computer-readable storage medium having computer-readable program code portions stored therein that in response to execution by a processor cause an apparatus to at least:
decompose a video sequence including a plurality of frames, wherein at least some of the frames include an image of a scene, at least some of the scenes including at least one object, the images of the at least some of the scenes including at least one image of the respective at least one object, wherein being caused to decompose a video sequence includes being caused to identify one or more transitions in the video sequence, each of the identified one of more transitions including at least one frame;
identify a plurality of objects from within the at least one frame of the identified one or more transitions in the video sequence;
assign a priority ranking to the identified objects, wherein being caused to assign a priority ranking includes being caused to assign a priority ranking to the identified objects based upon at least one variable associated with each of the identified objects, the at least one variable of an identified object comprising at least one of a size of the object, a number of frames including the object, a motion characterization of the object, or a number of video transitions including the object;
select at least some of the identified objects based upon the assigned priority rankings of the respective objects;
extract the selected objects from the frames of the video sequence including the respective objects; and
combine the selected and extracted objects into an image representation of the video sequence.

16. A computer program product according to claim 15, wherein being caused to extract the selected objects includes being caused to extract the selected objects such that at least one of the selected objects is extracted from a frame different from the frame from which another of the selected objects is extracted.

17. A computer program product according to claim 15, wherein the computer-readable storage medium has computer-readable program code portions stored therein that in response to execution by the processor cause the apparatus to further:
alter at least one of the identified objects to thereby denote a relative importance of the respective at least one object in the frames of the video sequence, at least one of the altered objects being combined with at least one other object into the image representation of the video sequence.

18. A computer program product according to claim 15, wherein being caused to assign a priority ranking includes being caused to classify at least some of the identified objects as a key object or a context object, at least one object being classified as a key object based upon at least one of the respective object being included in a measurable amount of motion within at least some of the frames of the video sequence, or being in a center of focus of at least some of the frames, and
wherein being caused to select at least some of the identified objects includes being caused to select at least some of the identified objects such that at least one of the selected objects comprises a key object.

* * * * *